United States Patent [19]
Schmidt

[11] 3,779,100
[45] Dec. 18, 1973

[54] VARIABLE SPEED TRANSMISSION

[76] Inventor: Richard Schmidt, 11525 Islandale Dr., Cincinnati, Ohio 45240

[22] Filed: Sept. 8, 1972

[21] Appl. No.: 287,481

[52] U.S. Cl............ 74/665 N, 74/325, 74/665 GA, 74/665 GE, 74/665 P
[51] Int. Cl..................... F16h 37/06, F16h 3/08
[58] Field of Search........... 74/325, 665 G, 665 GA, 74/665 GE, 665 N

[56] References Cited
UNITED STATES PATENTS

| | | | |
|---|---|---|---|
| 2,179,171 | 11/1939 | Boho | 74/665 GA |
| 2,560,865 | 7/1951 | Hindmarch | 74/665 N X |
| 2,642,756 | 6/1953 | Cummings | 74/665 GA |
| 2,969,553 | 1/1961 | Hatherell et al. | 74/665 GE X |
| 3,438,447 | 4/1969 | Ferris | 74/665 N UX |
| 3,459,068 | 5/1969 | Mahringer et al. | 74/665 N |

*Primary Examiner*—Arthur T. McKeon
*Attorney*—John W. Malley et al.

[57] ABSTRACT

A multiple speed transmission assembly wherein a plurality of drivingly interconnected rotary members are mounted within a central housing in a geometrical arrangement in which the axis of rotation or shafts of the rotary members are spaced circumferentially about a cylindrical plane in equally spaced parallel relation to the axis of the cylindrical plane so that a driving member can be selectively drivingly connected to one end of any of the rotary member shafts by either positioning the axis of the cylindrical plane in line with the driving shaft and utilizing a pair of meshing gears or the like as the driving connection or mounting the cylindrical plane in line with the driving shaft and mounting the central housing for selective rotation about the axis of the cylindrical plane to effect the driving connection with the driving shaft and so that similar driving connections can be utilized to selectively connect the opposite ends of the shafts of the rotary members to a driven member.

22 Claims, 9 Drawing Figures

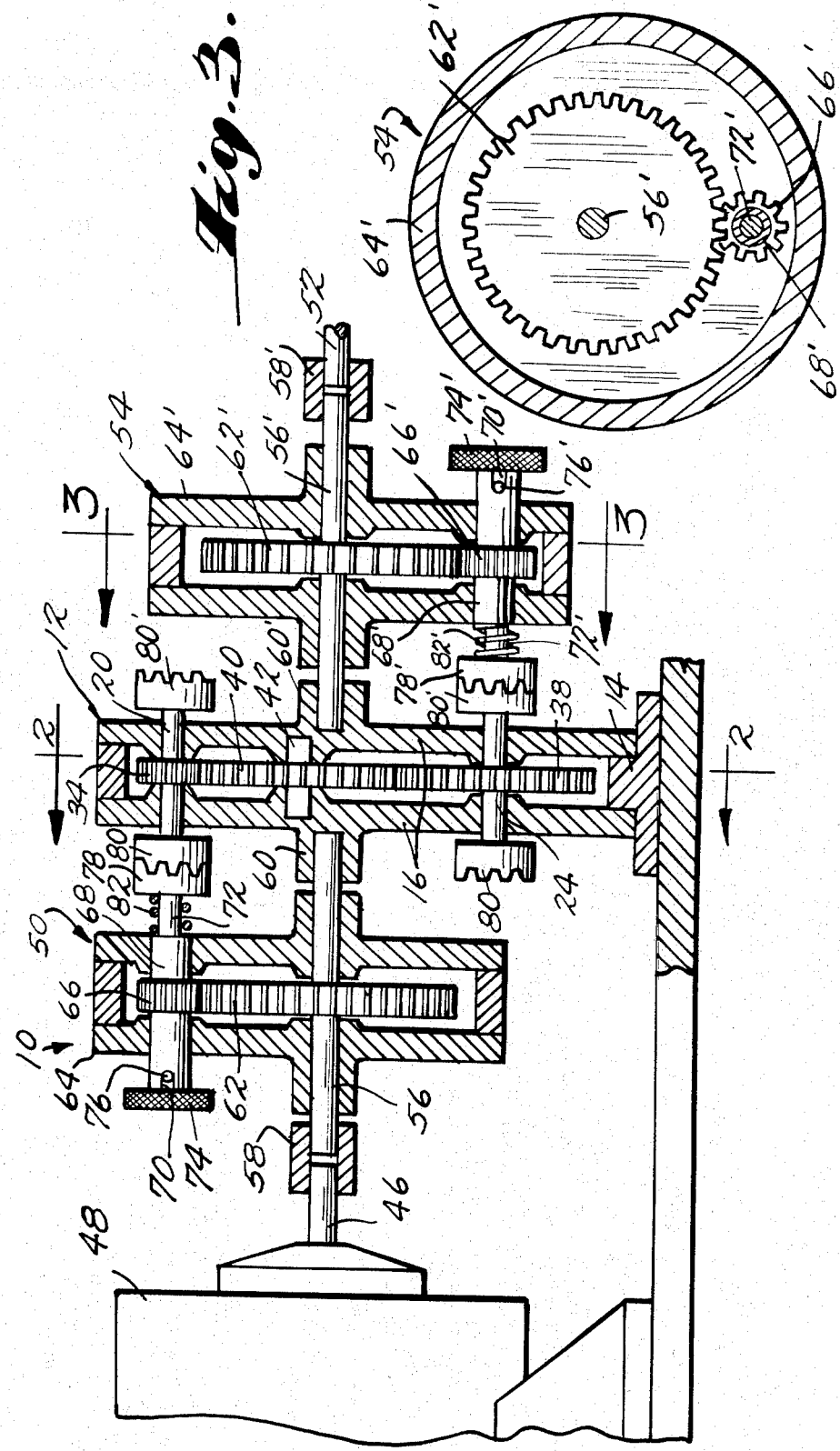

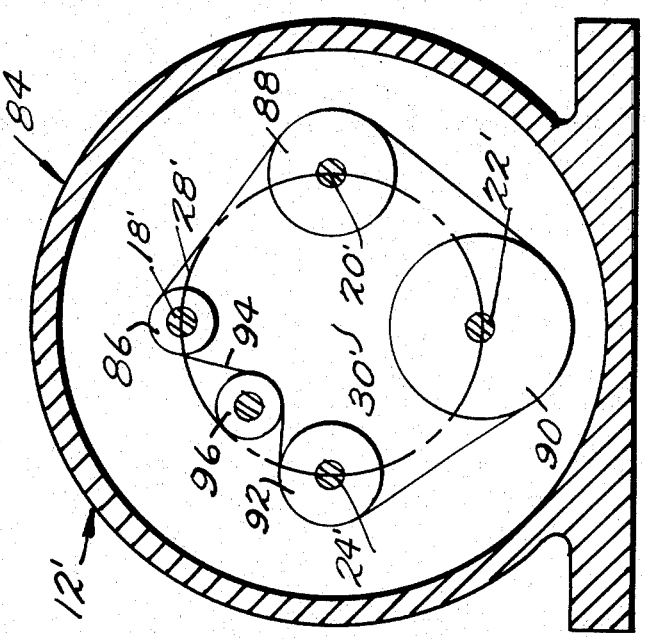
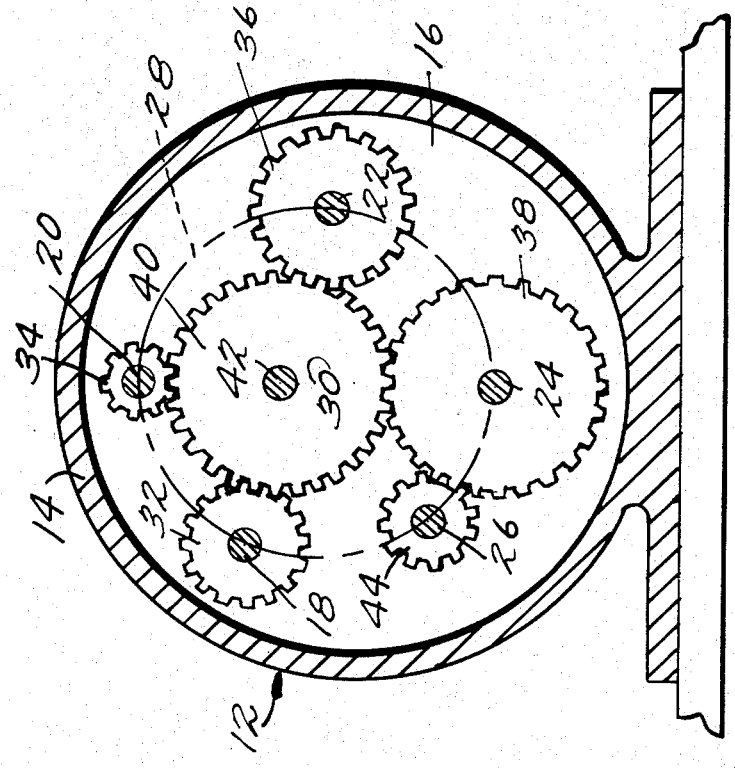

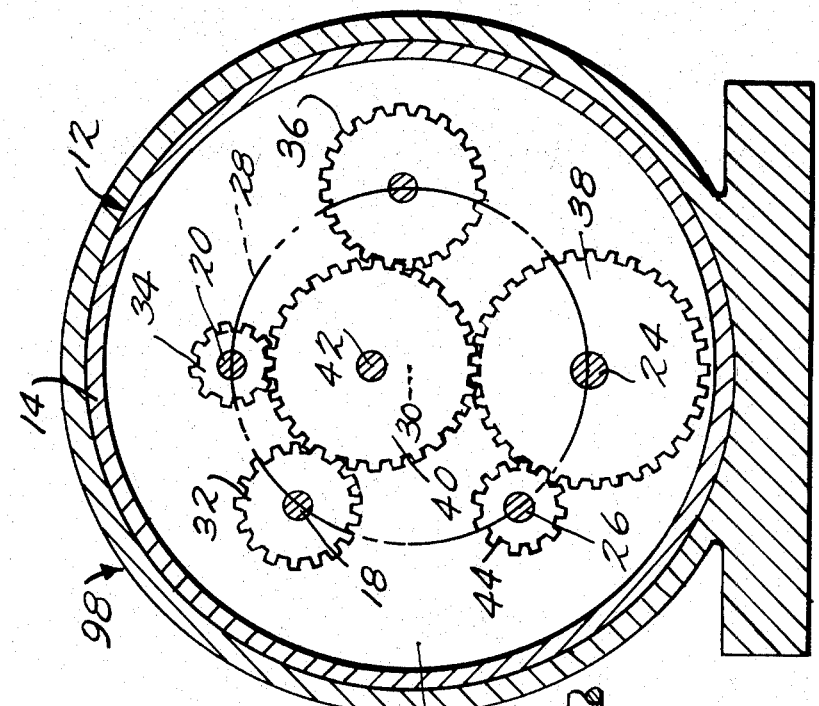
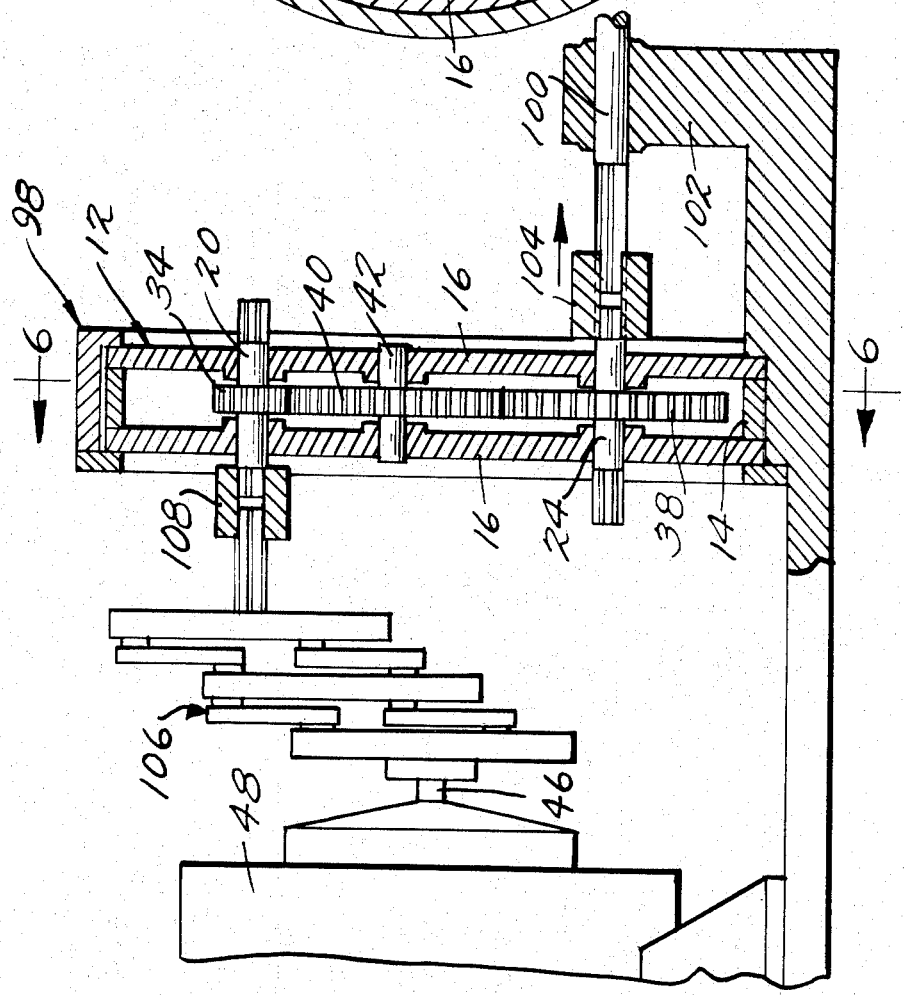

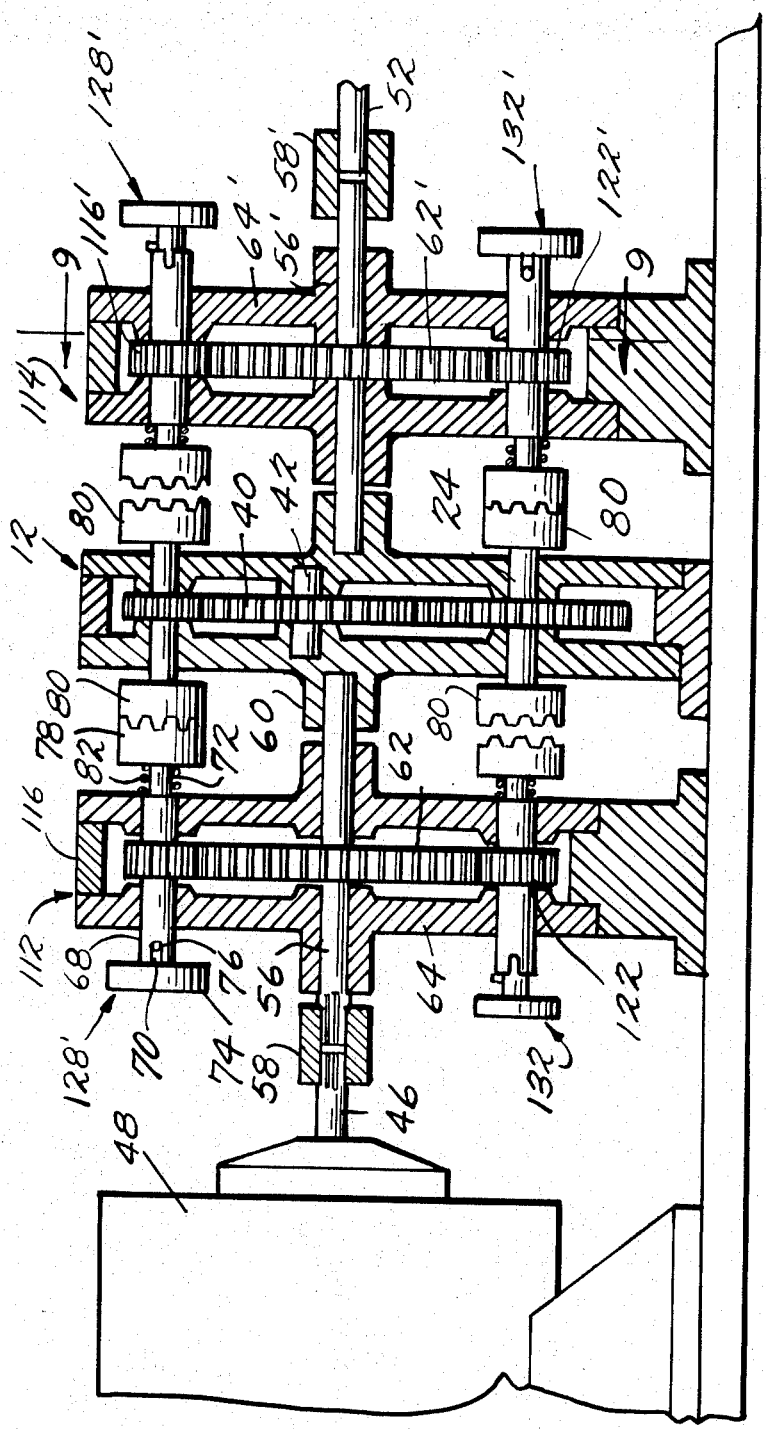

VARIABLE SPEED TRANSMISSION

This invention relates to the transmission of rotary movement and more particularly to an improved transmission assembly for transmitting the rotary movement of a driving member to a driven member at different selected speeds.

In my U.S. Pat. No. 3,505,893, issued Apr. 14, 1970, there is disclosed a multiple speed transmission assembly which includes a central housing having an internal ring gear journaled therein and a plurality of pinion gears of different sizes meshing with the internal teeth of the ring gear, each pinion gear being fixed to a shaft intermediate the ends thereof. With this arrangement, the shafts of the pinion gears were at all times drivingly connected to rotate at different speeds. The assembly of my prior patent provided a first coupling of the type disclosed in my U.S. Pat. No. 3,242,694 for drivingly connecting the driving member selectively to one end of any one of the pinion shafts and a second similar coupling for drivingly connecting the driven member selectively to the other end of any one of the pinion shafts. By selecting the appropriate shaft connections, a high ratio of speed changes per number of gears provided could be obtained.

An object of the present invention is the provision of a multiple speed transmission assembly of the type described above having a central housing provided with a series of gears drivingly interconnected of different diameter size or equivalent rotary members mounted therein in an improved geometrical arrangement which permits the utilization of simplified couplings as well as the coupling of my aforesaid patent as the means for selectively drivingly connecting the driving and driven members with the shafts of the rotary elements to obtain speed variation. In accordance with the principles of the present invention, this objective is obtained by mounting the rotary members of the central housing in a geometrical arrangement in which the axis of rotation or shafts of the rotary members are spaced circumferentially about a cylindrical plane in parallel relation to the axis of the cylindrical plane. With this geometrical arrangement, a driving member, such as a motor shaft, can be selectively drivingly connected to one end of any of the gear shafts by either positioning the axis of the cylindrical plane in line with the driving shaft and utilizing a pair of meshing gears or the like as the driving connection or mounting the cylindrical plane in line with the driving shaft and mounting the central housing for selective rotation about the axis of the cylindrical plane to effect the driving connection with the driving shaft. Similar driving connections can be utilized to selectively connect the gear shafts to the driven member.

Another object of the present invention is the provision of a transmission assembly of the type described, which is simple in construction, effective in operation, and economical to manufacture and maintain.

These and other objects of the present invention will become more apparent during the course of the following detailed description and appended claims.

The invention may best be understood with reference to the accompanying drawings wherein illustrative embodiments are shown.

IN THE DRAWINGS

FIG. 1 is a vertical, sectional view of a preferred form of a transmission assembly embodying the precepts of the present invention;

FIG. 2 is a sectional view taken along the line 2—2 of FIG. 1;

FIG. 3 is a sectional view taken along the line 3—3 of FIG. 1;

FIG. 4 is a view similar to FIG. 2 illustrating another form of the transmission assembly;

FIG. 5 is a view similar to FIG. 1 illustrating still another form of transmission assembly constructed in accordance with the principles of the present invention;

FIG. 6 is a sectional view taken along line 6—6 of FIG. 5;

FIG. 8 is a view similar to FIG. 1 showing still another modified form of the invention.

Figure 9:
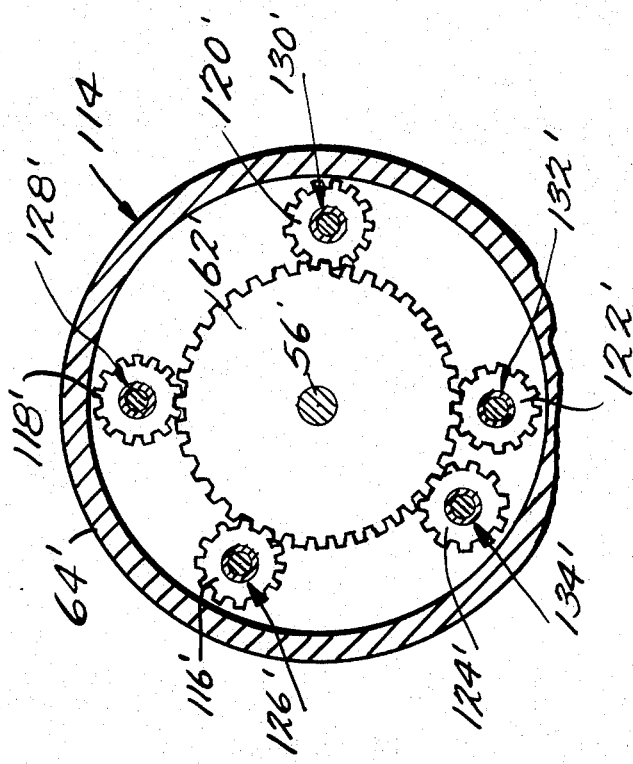
FIG. 9 is a sectional view taken along the line 9—9 of FIG. 8.

Referring now more particularly to FIGS. 1-3 of the drawings, there is shown therein a preferred form of a transmission assembly, generally indicated at 10, embodying the principles of the present invention. The assembly 10 includes a central housing structure generally indicated at 12 which may be of any conventional construction. The housing 12 as illustrated in FIG. 1 is generally schematic in nature and includes an annular housing section 14 having a mounting flange on the exterior thereof and a pair of side housing sections 16 detachably fixedly mounted on opposite sides of the annular section 14. Journaled within the housing structure 12 is a series of parallel shafts of a number which is at least a plurality, preferably at least four.

As best shown in FIG. 2, the preferred form of the invention includes five shafts in the series which are identified by the reference numerals 18, 20, 22, 24 and 26. These shafts are journaled within the housing structure 12 for rotational movement about axes spaced annularly within a cylindrical plane, indicated at 28, having an axis, indicated at 30, which is parallel with and equidistantly spaced from the axes of the shafts. It will be understood that the shafts may be journaled within the housing structure 12 by any conventional bearing arrangement.

In the somewhat schematic arrangement illustrated, the shafts are journaled within the side housing sections 16 so that opposite ends thereof extend outwardly from the associated side housing section and an intermediate portion of each shaft extends between the side housing sections in alignment with the annular housing section 14. Rotatably fixedly mounted on the series of shafts 18-24 is a corresponding series of gears 32, 34, 36 and 38, the gears being of different diameter size and having the usual peripheral teeth of a different number. The gears 32–38 are each disposed in meshing relation with an idler gear 40 for rotational movement within the housing structure 12 about an axis parallel with the axes of the shafts and with the axis 30 of the cylindrical plane 28. As shown, the idler gear 40 is suitably fixed to a stub shaft 42, which is, in turn, journaled within the side housing sections 16. It can be seen that since gears 32, 34, 36 and 38 are all disposed in meshing engagement with the idler gear 40, all of the gears will be simultaneously moved together in the same direction at speeds proportional to the diameter size and number of teeth. Mounted on shaft 26 is a fifth gear 44, which is disposed in meshing engagement with the gear 38 so as to be simultaneously moved with the other gears of the series, but in a reverse direction.

In accordance with the principles of the present invention, means is provided for selectively drivingly connecting a driving member, such as a shaft 46 of an electrical motor 48 or the like, with an input end of any one of the series of shafts 18–26. In the preferred form of the transmission assembly 10, illustrated in FIGS. 1–3, this means is in the form of a transmission unit, generally indicated at 50.

The transmission assembly 10 also is provided with means for selectively drivingly connecting a driven member, such as a shaft 52, with the output end of any one of the series of shafts 18–26. In the embodiment shown, this means is preferably in the form of a transmission unit 54, which as shown is preferably of substantially identical construction to the unit 50.

The transmission assembly 10 as shown is constructed so as to transmit rotary movement of the driving member 46 to the driven members 52, when the latter are disposed in spaced axial alignment. The central housing structure 12 is mounted centrally between the driving and driven members 46 and 52, with the axis 30 of the cylindrical plane 28 coincident with the axis of rotation of the driving and driven members.

With the above in mind, the unit 50 will now be described, it being understood that the unit 54 is of identical construction and that the parts thereof are identified with primed reference numerals corresponding to those used in the description of the unit 50. The unit 50 includes a shaft section 56, one end of which is detachably coupled in axial alignment with the motor shaft 46 by any suitable means, such as a conventional sleeve coupler 58 or the like and the opposite end of which is journaled within a boss 60 formed in the exterior of the adjacent side housing section 16 of the central housing structure 12. Rotatably fixed to the shaft section 56 intermediate the ends thereof is a driving gear 62. Mounted in surrounding relation to the gear 62 and journaled on the portions of the shaft section 56 extending outwardly from the gear 62 on the opposite sides thereof is a rigid housing structure 64. This housing structure may be of any suitable construction and is shown generally schematically as having the same sectionalized construction as that of the housing structure 12. The housing structure 64 serves to rotatably support a driving gear 66 in meshing relation with the gear 62 for rotation about an axis disposed within the cylindrical plane 28 and spaced in parallel relation from the axis 30 thereof a distance equal to the distance between the axis 30 and the axis of the series of shafts 18–26. The driving gears 62 and 66 may be of any relative size. It will also be understood that the meshing gears 62' and 66' embodied in the unit 54 may be of different size than the gears 62 and 66 of the unit 50.

Since the housing structure 64 is rotatable about the shaft 56, the axis of which is aligned with the axis 30, the driving gear 66 is thus capable of being moved into a position of axial alignment with any one of the gears 18–26. In accordance with the principles of the present invention, means is provided for detachably drivingly connecting the driving gear 66 with any one of the shafts 18–26. In the preferred embodiment shown in FIGS. 1–3, this means preferably includes a hollow shaft 68 suitably journaled within the housing structure 64 so that an intermediate portion thereof rotatably, fixedly receives the gear 66. The end of the hollow shaft 68, remote from the central housing structure 12, extends outwardly of the housing structure 64 and has a slot 70 formed therein. Mounted within the hollow shaft 68, for both axial movement and rotatable movement with respect thereto, is an inner shaft 72. The shaft 72 extends outwardly of the slot 70 and has a knob 74 fixed to the end thereof and a pin 76 extending radially outwardly thereof in inwardly spaced relation to the knob, which pin is of a size to engage within the slot 70.

Fixed to the opposite end of the shaft 72 is a clutch element 78 which has face teeth adapted to engage cooperating face teeth of a cooperating clutch element 80. In the embodiment shown, a clutch element 80 is fixed to the input end of each of the shafts 18–26. In order to maintain the clutch elements 78 and 80 in cooperative engagement, a coil spring 82 is mounted in surrounding relation to the inner shaft 72 between the clutch element 78 and the hollow shaft 68. It will be understood that the clutch element 78 can be disengaged from any aligned clutch element 80 by grasping the knob 74 so as to move the shaft 72 against the action of the spring 82 until the pin 76 is disengaged from the slot 70. By then turning the knob relative to the hollow shaft 68, the engagement of the pin with the end of the hollow shaft will serve to maintain the clutch element 78 in its disengaged position, permitting rotational movement of the housing structure 64 into any desired or selected position of movement into alignment with any desired or selected one of the series of shafts 18–26 for engagement with the clutch element 80 thereof.

It will be understood that the gear train mounted in the central housing structure 22 provides a number of speed variations similar to that provided by the central gear train disclosed in my earlier patent 3,505,893. As indicated in the aforesaid patent, this speed variation can be mathematically expressed as $v = (z^2 - z) + 1$ where v equals the number of possible speed variations and z represents the number of gears having axes of rotation within the cylindrical plane 28 spaced equidistantly from the center 30 thereof.

Thus, with the embodiment shown in FIGS. 1–3 and described above, thirteen forward speeds can be obtained from the four gears 32–38 with a total of 21 speeds possible when the gear 44 is also considered. Several advantages are obtained by the geometrical relationship of the gear train of the present invention as distinguished from that disclosed in my prior patent. First, the idler gear 40 which serves to simultaneously rotate the gears 32–38 is a simple relatively small spur gear rather than a relatively large internal ring gear. Second, the arrangement for selectively interconnecting the shafts 18–26 with the driving member and the driven member can be relatively simple and does not require a mechanism capable of providing for radial movement, as is the case in my prior patent.

With respect to the first advantage noted above, it will further be understood that the geometrical relationship of the present invention may be provided by rotary motion transmitting elements other than spur gears which are interconnected by a member other than a central meshing gear. For example, in FIG. 4, there is illustrated a central unit, generally indicated at 84, including a housing structure 12' within which a series of four shafts 18', 20', 22' and 24' are mounted within a cylindrical plane 28' in equidistantly spaced relation to the axis 30' thereof. Secured to the shafts 18'–24' in lieu of the gears previously described in a series of rotary elements 86, 88, 90 and 92 in the form of conventional pulleys. As before, the pulleys are of different diameter. With this arrangement, the periphery of the pulleys can be interconnected for simultaneous rotation in the same direction at speeds determined by the diameter size thereof by flexible elongated member in the form of an endless belt 94 trained about the peripheries of the pulleys. A belt tensioning pulley 96 of conventional design may be provided if desired, as shown in FIG. 4. It will also be understood that the belt 94 may be in the form of a timing belt, with the periphery of the pulleys 86–92 provided with cooperating teeth rather than v-grooves, in accordance with conventional practice. Likewise, the endless, flexible member 94 may be in the form of a chain, with the rotary members 86–92 being sprocket wheels rather than pulleys.

With respect to the second advantage noted above, FIG. 5 illustrates another arrangement by which the shafts 18–26 can be easily and conveniently selectively drivingly connected to the driving member and the driven member.

In the embodiment shown in FIG. 5, the central unit, including the housing structure 12, is mounted for rotational movement in a fixed housing structure 98 for rotational movement about the axis 30 of the cylindrical plane 28. With this arrangement, either the input shaft or the output shaft, which is selectively connected with either the input ends or output ends of the shafts 18–26 can be mounted in fixed position so long as its axis of rotation is disposed within the cylindrical plane 28 is equidistantly spaced relation from the axis 30.

In the embodiment shown in FIG. 5, a driven member 100 is fixedly mounted in the aforesaid relationship as by a fixed bearing structure 102. In the embodiment shown, the shaft 100 is detachably connected with any one of the shafts 18–26 by a simple collar coupling 104 suitably splined to the end of the shaft 100 and adapted to engage splines on the end of each of the shafts 18–26.

FIG. 5 also illustrates that a coupling such as disclosed in my U.S. Pat. No. 3,242,694 may also be used in conjunction with the present invention, as indicated at 106. In this regard, it will be understood that an arrangement, such as illustrated in FIG. 3 of my aforesaid U.S. Pat. No. 3,505,893, may be utilized to selectively interconnect the output shaft of the coupling 106 selectively with any one of the shafts 18–26, the cam surfaces of that patent being arcuate about the axis 30 and the movable frame carrying the clutch being simply pivoted in a manner similar to that of the housing 64 of the unit 50. In FIG. 5, however, a simple collar coupling 108 is provided which is suitably splined in a manner similar to the collar coupling 104.

The capabilities which are afforded by mounting the housing structure 12 for rotational movement about the axis 30 enable a plurality of similar units to be mounted in side by side relation, thus increasing the number of speed variations by a power of 2. This speed variation can be expressed mathematically by the formula $v = (z^2 - z = 1)^2$ where, again, $v$ is the number of possible speed variations and $z$ is the number of gears provided by the central unit.

Figure 7:
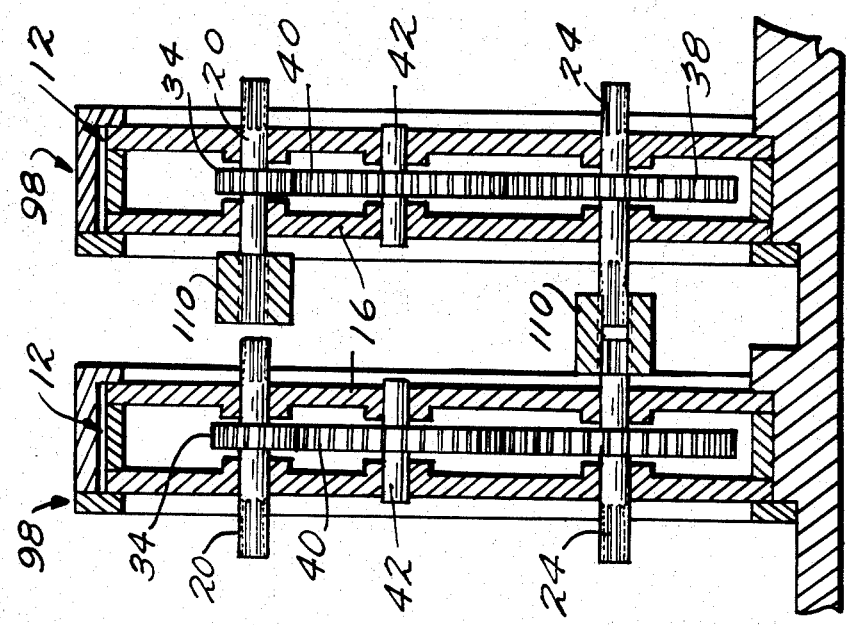
FIG. 7 is a view similar to FIG. 5 illustrating a modification of the device shown in FIG. 5.

With reference to FIG. 7, it will be noted that all that need be provided to obtain these greatly multiplied number of speed variations is a series of selectively detachable couplings 110.

In accordance with the above formula, it can be seen that by rotatably adjusting the two housing structures 12 with respect to each other so that any two of the shafts 18 through 24 are aligned, drivingly interconnecting the same by the associated coupling 110, and then connecting the outer ends of the shafts of both units to a driving and driven member in the manner previously described, 169 different speeds can be selected. Considering the two reversing shafts 26, the number of different speeds is 441.

From the above, it can be seen that the basic geometry of the present invention provides a simple and economical manner of achieving a maximum number of speed changes, with a minimum number of gears or equivalent rotary motion transmitting members. Where convenience is more important than economy, the geometrical relationship of the present invention can also be used to good advantage. An arrangement of this type is disclosed in FIGS. 8 and 9.

The arrangement of FIG. 8 utilizes a central unit similar to the one illustrated in FIG. 1, but provides a pair of units 112 and 114 on opposite sides thereof which permit the assembly to obtain the same number of speed changes solely by the actuation of clutches, without the necessity of effecting any pivotal movements. Here, again, the units 112 and 114 are preferably of substantially identical construction, each includes all of the component elements of the unit 50 previously described except that rather than providing a single meshing gear 66 and associated clutch assembly, there is provided a series of such gears 116, 118, 120, 122 and 124 and associated clutch assemblies 126, 128, 130, 132 and 134 of a number equal to the number of shafts provided by the central unit, with the gears and clutch assemblies being mounted in alignment therewith. With this arrangement, the operator need only effect engagement of the clutch assemblies associated with the desired shafts of the central unit selected, insuring that the other clutch assemblies are disengaged and maintained in their disengaged position.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A transmission assembly for transmitting the rotary movement of the driving member to a driven member at different selected speeds comprising a housing having a series of at least four parallel shafts journaled therein for rotational movement about axes spaced annularly within a cylindrical plane having its axis parallel with and equidistantly spaced from the axes of said shafts, a series of at least four rotary motion transmitting members of different diameter size operatively fixed to said shafts in alignment with one another in a transverse direction intermediate the ends of said shafts, means disposed in transverse alignment with said rotary members drivingly interconnecting the peripheries of said rotary members so that said series of shaft will rotate simultaneously about their axes at different speeds proportional to the diameter size of the rotary member associated therewith, means for selectively drivingly connecting a driving member with one end of any one of said series of shafts, and means for selectively drivingly connecting a driven member with the other end of any one of said series of shafts.

2. A transmission assembly as defined in claim 1 wherein said means drivingly interconnecting the peripheries of said rotary members comprises an endless flexible member.

3. A transmission assembly as defined in claim 1 wherein said means drivingly interconnecting the peripheries of said rotary members comprises an idler gear having teeth on the exterior periphery thereof, and meshing teeth formed on the exterior periphery of said rotary members.

4. A transmission assembly for transmitting the rotary movement of a driving member to a driven member at different selected speeds comprising a housing having a series of at least four parallel shafts journaled therein for rotational movement about axes spaced annularly within a cylindrical plane having its axis disposed parallel with the axes of said shafts, a series of at least four gears rotatably fixedly mounted on said series of shafts intermediate the ends thereof, said series of gears being of different size and having exterior peripheral teeth of a different number, a central idler gear journaled in said housing for rotational movement about an axis parallel with the axis of said cylindrical plane, said idler gear having peripheral teeth disposed in meshing relation with the peripheral teeth of said series of gears for drivingly interconnecting the same so as to effect simultaneous rotational movement of said series of shafts at different speeds, means for selectively drivingly connecting a driving member with one end of any one of said series of shafts so that the rotational movement of said one shaft determines the different speeds of simultaneous movement of said series of shafts, and means for selectively drivingly connecting a driven member with the other end of any one of said series of shafts so that the driven speed of said driven member is determined by the speed of the one shaft to which it is drivingly connected, thus enabling the operator to select a number of different driven member speeds for a given driving member speed.

5. A transmission assembly as defined in claim 4 wherein said means for selectively drivingly interconnecting said driving member includes a first driving shaft having one end thereof drivingly connected with said driving member and mounted for rotational movement thereby about an axis in alignment with the axis of said cylindrical plane, a rigid structure mounted for rotation about the axis of said first driving shaft, a second driving shaft journaled in said rigid structure for rotation about an axis aligned with said cylindrical plane and spaced from the axis thereof a distance equal to the aforesaid spacing and for movement with said rigid structure about the axis of said first driving shaft to position the axis of said second driving shaft in any desired position within said cylindrical plane, means for drivingly connecting said first and second driving shafts, and means for detachably drivingly connecting an end of said second driving shaft selectively to the one end of any one of said series of shafts when moved into axial alignment therewith.

6. A transmission assembly as defined in claim 5 wherein said means for drivingly connecting said first and second driving shafts comprises meshing gears fixed to said first and second driving shafts respectively.

7. A transmission assembly as defined in claim 4 wherein said means for selectively drivingly interconnecting said driving member includes a second series of at least four shafts, means mounting said second series of shafts for rotational movement about axes aligned with the axes of said first-mentioned series of shafts respectively and spaced therefrom a distance equal to the aforesaid spacing, means drivingly connected with said driving member for simultaneously driving said second series of shafts, and means for detachably drivingly connecting the one end of any one of the first-mentioned series of shafts with an adjacent end of the aligned shaft of said second series of shafts.

8. A transmission assembly as defined in claim 7 wherein said means for simultaneously driving said second series of shafts comprises a driving shaft having one end thereof drivingly connected with said driving member, means journaling said driving shaft for rotational movement about an axis aligned with the axis of said cylindrical plane, a driving gear fixed to said driving shaft and a second series of gears fixed to said second series of shafts respectively, said second series of gears being of the same size and disposed in meshing relation to said driving gear.

9. A transmission assembly as defined in claim 7 wherein said means for simultaneously driving said second series of shafts comprises a second series of gears fixed to said second series of shafts respectively, said second series of gears being of different diameter size and having peripheral teeth of a different number, a second idler gear having peripheral teeth disposed in meshing engagement with the teeth of said second series of gears, said means for mounting said second series of gears comprising a second housing structure, means mounting said second housing structure for pivotal movement about the axis of said cylindrical plane so as to enable any one of said second series of shafts to be moved into axial alignment with any one of said first series of shafts, and means for selectively drivingly connecting a driving member with the other end of any one of the second series of shafts.

10. A transmission assembly as defined in claim 4 wherein said means for selectively drivingly interconnecting said driven member includes a first output shaft having one end thereof drivingly connected with said driven member and mounted for rotational movement thereby about an axis in alignment with the axis of said cylindrical plane, a rigid structure mounted for rotation about the axis of said first output shaft, a second output shaft journaled in said rigid structure for rotation about an axis aligned with said cylindrical plane and spaced from the axis thereof a distance equal to the aforesaid spacing and for movement with said rigid structure about the axis of said first output shaft to position the axis of said second output shaft in any desired position within said cylindrical plane, means for drivingly connecting said first and second output shafts, and means for detachably drivingly connecting an end of said second output shaft selectively to the one end of any one of said series of shafts when moved into axial alignment therewith.

11. A transmission assembly as defined in claim 10 wherein said means for drivingly connecting said first and second output shafts comprises meshing gears fixed to said first and second output shafts respectively.

12. A transmission assembly as defined in claim 10 wherein said means for selectively drivingly interconnecting said driving member includes a first input shaft having one end thereof drivingly connected with said driving member and mounted for rotational movement thereby about an axis in alignment with the axis of said cylindrical plane, a second rigid structure mounted for rotation about the axis of said first driving shaft, a second input shaft journaled in said second rigid structure for rotation about an axis aligned with said cylindrical plane and spaced from the axis thereof a distance equal to the aforesaid spacing and for movement with said second rigid structure about the axis of said first input shaft to position the axis of said second input shaft in any desired position within said cylindrical plane, means for drivingly connecting said first and second input shafts, and means for detachably drivingly connecting an end of said second input shaft selectively to the one end of any one of said series of shafts when moved into axial alignment therewith.

13. A transmission assembly as defined in claim 4 wherein said means for selectively drivingly interconnecting said driven member includes a second series of at least four shafts, means mounting said second series of shafts for rotational movement about axes aligned with the axes of said first-mentioned series of shafts respectively and spaced therefrom a distance equal to the aforesaid spacing, means drivingly connected with said driven member for simultaneously driving said second series of shafts, and means for detachably drivingly connecting the one end of any one of the first-mentioned series of shafts with an adjacent end of the aligned shaft of said second series of shafts.

14. A transmission assembly as defined in cclaim 13 wherein said means for simultaneously driving said second series of shafts comprises an output shaft having one end thereof drivingly connected with said driven member, means journaling said output shaft for rotational movement about an axis aligned with the axis of said cylindrical plane, an output gear fixed to said output shaft and a second series of gears fixed to said second series of shafts respectively, said second series of gears being of the same size and disposed in meshing relation to said output gear.

15. A transmission assembly as defined in claim 14 wherein said means for selectively drivingly interconnecting said driving member includes a third series of at least four shafts, means mounting said third series of shafts for rotational movement about axes aligned with the axes of said first-mentioned series of shaft respectively and spaced therefrom a distance equal to the aforesaid spacing, means for detachably drivingly connecting the one end of any one of the first-mentioned series of shafts with an adjacent end of the aligned shaft of said second series of shafts, an input shaft having one end thereof drivingly connected with said driving member, means journaling said input shaft for rotational movement about an axis aligned with the axis of said cylindrical plane, an input gear fixed to said input shaft and a third series of gears fixed to said third series of shafts respectively, said third series of gears being of the same size and disposed in meshing relation to said input gear.

16. A transmission assembly as defined in claim 13 wherein said means for simultaneously driving said second series of shafts comprises a second series of gears fixed to said second series of shafts respectively, said second series of gears being of different diameter size and having peripheral teeth of a different number, a second idler gear having peripheral teeth disposed in meshing engagement with the teeth of said second series of gears, said means for mounting said second series of gears comprising a second housing structure, means mounting said second housing structure for pivotal movement about the axis of said cylindrical plane so as to enable any one of said second series of shafts to be moved into axial alignment with any one of said first series of shafts, and means for selectively drivingly connecting a driving member with the other end of any one of the second series of shafts.

17. A variable speed transmission assembly comprising a central housing structure, a plurality of parallel shafts journaled in said central housing structure for rotational movement about axes spaced annularly within a cylindrical plane having its axis parallel with and equidistantly spaced from the axes of said shafts, a plurality of rotary motion transmitting members of different diameter size operatively fixed to said shafts in transverse alignement with one another intermediate the ends of said shafts, means disposed in transverse alignment with said rotary members drivingly interconnecting the peripheries of said rotary members so that said plurality of shafts will rotate simultaneously about their axes at different speeds proportional to the diameter size of the rotary member associated therewith, an input housing structure at one side of said central housing structure, an input rotary member journaled in said input housing structure for rotational movement about an axis disposed within said cylindrical plane in parallel spaced relation thereto a distance equal to the aforesaid spacing, an output housing structure at the opposite side of said central housing structure, an output rotary member journaled in said output housing structure for rotational movement about an axis disposed within said cylindrical plane in parallel spaced relation thereto a distance equal to the aforesaid spacing, means mounting at least two of said housing structures for pivotal movement about the axis of said cylindrical plane for enabling said input and output rotary members to be separately axially aligned with any one of said plurality of shafts, means for detachably drivingly connecting said input rotary member with the adjacent end of the shaft aligned therewith, and means for detachably drivingly connecting said output rotary member with the adjacent end of the shaft aligned therewith.

18. A transmission assembly as defined in claim 17 wherein said means drivingly interconnecting the peripheries of said plurality of rotary members comprises an endless flexible member.

19. A transmission assembly as defined in claim 17 wherein said means drivingly interconnecting the peripheries of said plurality of rotary members comprises an idler gear having teeth on the exterior periphery thereof, and meshing teeth formed on the exterior periphery of said plurality of rotary members.

20. A variable speed transmission assembly comprising:
a pair of side-by-side housing structures, each of said housing structures having a plurality of parallel shafts journaled therein for rotational movement about axes spaced annularly within a cylindrical plane having its axis parallel with and equidistantly spaced from the axes of said shafts, a plurality of rotary motion transmitting members of different diameter size operatively fixed to said shafts in alignment with one another in a transverse direction intermediate the ends of said shafts, and means disposed in transverse alignment with said rotary members drivingly interconnecting the peripheries of said rotary members so that said plurality of shafts will rotate simultaneously about their axes at different speeds proportional to the diameter size of the rotary member associated therewith, means mounting at least one of said housing structures for pivotal movement about the axis of said cylindrical plane for enabling any one of one plurality of shafts to be axially aligned with any one of the other plurality of shafts, means for detachably drivingly connecting the adjacent ends of the aligned shafts, means for selectively drivingly connecting a driving member with the other end of any one of said one plurality of shafts, and means for selectively drivingly connecting a driven member with the other end of any one of the other of said plurality of shafts.

21. A transmission assembly as defined in claim 20 wherein said means drivingly interconnecting the peripheries of each of said pluralities of rotary members comprises an endless flexible member.

22. A transmission assembly as defined in claim 20 wherein said means drivingly interconnecting the peripheries of each of said pluralities of rotary members comprises an idler gear having teeth on the exterior periphery thereof, and meshing teeth formed on the exterior periphery of the associated plurality of rotary members.

* * * * *